3,169,954
MONOAZO THIAZOLE DYESTUFFS
James M. Straley and John G. Fisher, Kingsport, Tenn., assignors to Eastman Kodak Company, Rochester, N.Y., a corporation of New Jersey
No Drawing. Filed Aug. 6, 1962, Ser. No. 214,832
8 Claims. (Cl. 260—158)

This invention relates to monoazo dyestuffs particularly useful for dyeing acrylic fibers.

The dyes are obtained by coupling diazo salts of certain 2-aminothiazoles with various amine coupling components and have the following general formula

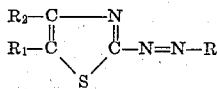

wherein

R=an aniline coupling component free of carboxyl or sulfo groups or hydroxyl groups ortho to the azo linkage e.g. lower dialkyl aniline, N-ethyl-N-$\beta$-hydroxyethylaniline, di-$\beta$-hydroxyethylaniline, N-$\beta$-hydroxyethyldiphenylamine, N,N,-diethyl-m-chloroaniline, N-$\beta$ - cyanoethyldiphenylamine, N-cyanoethylaniline, etc., $R_1$ and $R_2$ are different and represent (not simultaneously) hydrogen, lower alkyl, lower dialkylaminomethyl, morpholinomethyl, piperidinomethyl, or other reduced heterocyclic radical, illustrated hereinafter. A preferred group of dyes particularly efficacious for dyeing acrylic fibers have the above general formula wherein R is as above, $R_1$ is a morpholinomethyl or piperidinomethyl radical and $R_2$ is hydrogen or lower alkyl such as methyl, ethyl, propyl or butyl.

The dyes are therefore characterized by containing in either the 4- or 5-positions of the thiazole nucleus, a morpholinomethyl, piperidinomethyl or lower dialkylaminomethyl radical and the nuclear position not containing one of these groups may be unsubstituted or substituted with, for example, lower alkyl or aryl radical of the benzene series including phenyl and substituted phenyl. In the mentioned preferred group of compounds one of the 4- or 5-positions is substituted with morpholinomethyl or piperidinomethyl radicals and the other position is unsubstituted or contains an alkyl radical. The dyes are distinctive for use in dyeing acrylic fibers compared to known azo dyes obtained from other 2-aminothiazoles substituted in the 4- and 5-positions.

The 2-aminothiazoles compounds used in invention are prepared by hydrolysis of the corresponding acetylated derivatives prepared as described in Sprague, Land, Ziegler, J. A. C. S., 68, 2155 (1946), and Albertson, 70, 669–670 (1948), as illustrated in the following examples.

2-AMINO-5-MORPHOLINOMETHYLTHIAZOLE (I)

40 gms. of 2-acetamino-5-morpholinomethyl thiazole M.P. 125–127° C. are dissolved in 200 cc. of water and 100 cc. conc. HCl and stirred on the steam bath two hours. The solution is cooled, made basic with sodium carbonate and extracted with chloroform. The chloroform is evaporated off and the residue recrystallized from benzene. The crystals so obtained melt at 148–52° C.

2-AMINO-4-MORPHOLINOMETHYLTHIAZOLE (II)

To a solution of 26.2 g. 2-amino-4-chloromethylthiazole hydrochloride 7.5 g. $Na_2CO_3$, 10 cc. $H_2O$, and 150 cc. of ethanol there is added 25 g. of morpholine. The reaction mixture is stirred and heated on the steam bath for 2 hours. After addition of 100 cc. of water the alcohol is distilled off and the resulting solution extracted 3 times with 100 cc. of chloroform. After drying the extract over anhydrous $Na_2SO_4$ the chloroform was distilled off leaving 16 g. of light tan product.

2-AMINO-4-PHENYL-5-DIMETHYL-
AMINOMETHYLTHIAZOLE (III)

Twenty-four and five tenths grams of 2-acetamino-4-phenyl-5-dimethylaminomethylthiazole M.P. 157–160° C., 85 cc. of water and 42.5 cc. conc. HCl are stirred on the steam bath 2.5 hours. After cooling 30% NaOH is added below 40° C. until strongly basic. The product is filtered off, washed with water and air-dried, obtaining a material melting at 146–7° C.

2-AMINO-5-PIPERIDINOMETHYLTHIAZOLE (IV)

A solution of 85.2 g. of piperidine in 500 cc. of acetic acid is added to 142 g. of 2-acetamidothiazole in 79 cc. of 37% formaldehyde. The reaction is stirred and heated on the steam bath for 20 hours. 500 cc. of water is added and made basic with $K_2CO_3$. The product is filtered off washed with water and dried at room temperature. The product melts at 149–51° C. When hydrolyzed according to the method of Compound III the 2-amino-5-piperidinomethylthiazole melting at 156–8° C. is obtained.

2-AMINO-5-DI($\beta$-CYANOETHYL)
AMINOMETHYLTHIAZOLE (V)

The process of preparing Compound IV is carried out except using 123 g. of di($\beta$-cyanoethyl) amine in place of piperidine the product obtained being a sticky solid.

2-AMINO-4-PHENYL-5-PIPERIDINO-
METHYLTHIAZOLE (VI)

The procedure for Compound IV is carried out except using 219 g. of 2-acetamido-4-phenylthiazole (M.P. 209–212° C.). The resulting amine melts at 226–30° C.

2-AMINO-4-METHYL-5-PIPER-
IDINOMETHYLTHIAZOLE (VII)

The procedure for Compound IV is carried out except using 159 g. of 2-acetamido-4-methylthiazole (M.P. 125–9° C.). The resulting amine melts at 140–144° C.

2-AMINO-4-DIMETHYLAMINO-
METHYLTHIAZOLE (VIII)

J. A. C. S., 68, 2155 (1946).

Compounds I, II, IV and VII illustrate the preferred 2-aminothiazoles having the above general formula wherein $R_2$ is hydrogen. Additional compounds of this group prepared similarly and described in more detail below are:
2-amino-4-piperidinomethylthiazole
2-amino-5-methyl-4-piperidinomethylthiazole The preparation of representative dyes contemplated by the invention is illustrated by the following examples.

Example 1

To a solution of 1.8 g. $NaNO_2$ in 13 cc. conc. $H_2SO_4$, 25 cc. of 1:5 acid (propionic-acetic) was added below 25° C. At 0–5° C. a solution of 4.18 g. (0.021 m.) 2-amino- 5-morpholinomethylthiazole (I above) in 25 cc. 1:5 acid. After two hours of stirring at 0–5° C. the diazo solution was added to a solution of 3.05 g. (0.025 m.) N,N-dimethylaniline in 250 cc. 5% HCl and ice. After two hours of stirring the mix was neutralized with aqueous carbonate solution. The dye was filtered off, washed with water, and air-dried. The product dyes arcylic polymer fibers in fast violet shades.

The dye has the following structure

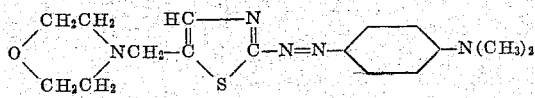

*Example 2*

To a slurry of 1.2 g. (0.005 m.) 2-acetamido-5-piperidylmethylthiazole in 12 cc. of water was added 7 cc. of conc. $H_2SO_4$ at such rate that the temperature rose above 80° C. but not above 95° C. The solution was allowed to cool for 30 minutes, then chilled to 0° C. A solution of 0.36 g. $NaNO_2$ in 2.5 cc. $H_2SO_4$ was added below 5° C. After two hours of stirring at 0–5° C. the diazo solution was added to 0.94 g. (0.005 m.) of N-ethyl-N-β-cyanoethyl-m-toluidine in 50 cc. of 6% HCl and ice. After two hours of stirring without further cooling the mix was neutralized with aqueous carbonate. The dye was isolated as above, obtaining a product which imparted fast violet shades to an acrylic polymer cloth.

*Example 3*

In the manner of Example 2, 1.78 g. of 2-acetamido-4-methyl-5-morpholinomethylthiazole was hydrolyzed and diazotized and coupled with 0.9 g. of diphenylamine. The dye imparts fast blue shades to acrylic polymers.

The dye has the following formula

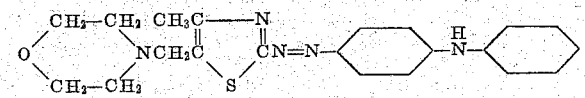

*Example 4*

In the manner of Example 1, 3.3 g. of 2-amino-4-dimethylaminomethylthiazole (VIII above) was diazotized and coupled with N,N-dimethylaniline. The dye imparts fast violet shades to acrylic polymers.

The dyes described in the following table are prepared in the manner of the above examples

| $R_1$ | $R_2$ | Coupler | Color of Dye on acrylic fiber |
|---|---|---|---|
| O(CH₂CH₂)₂NCH₂– (morpholinomethyl) | H– | N-ethyl-N-β-cyanoethyl-m-toluidine. | Violet. |
| O(CH₂CH₂)₂NCH₂– (morpholinomethyl) | H– | Diphenylamine. | Do. |
| O(CH₂CH₂)₂NCH₂– (morpholinomethyl) | $C_6H_5$– | N-ethyl-N-β-hydroxyethylaniline. | Do. |
| CH₃(CH₂CH₂)₂NCH₂– | H– | Di-β-cyanoethylaniline. | Red. |
| CH₂(CH₂CH₂)₂NCH₂– | $CH_3$– | Di-β-hydroxyethylaniline. | Blue-violet. |
| $(CNCH_2CH_2)_2NCH_2$– | H– | N-β-hydroxyethyldiphenylamine. | Do. |
| H– | $(CH_3)_2NCH_2$– | N,N-diethyl-m-chloroaniline. | Red-violet. |
| H– | O(CH₂CH₂)₂NCH₂– | N-β-cyanoethyldiphenylamine. | Do. |
| CH₂(CH₂CH₂)₂NCH₂– | $C_6H_5$– | N-cyanoethylaniline. | Do. |
| $(CH_3)_2NCH_2$– | $C_6H_5$– | do. | Do. |
| O(CH₂CH₂)₂NCH₂– | H– | N,N-dimethylaniline. | Do. |
| $CH_3$– | CH₂(CH₂CH₂)₂NCH₂– | do. | Do. |
| $CH_3$– | O(CH₂CH₂)₂NCH₂– | do. | Do. |

The dyes are particularly useful for dyeing acrylic fibers such as polyacrylonitrile, copolymers of acrylonitrile and graft polymers of acrylonitrile e.g. vinylidene chloride-acrylonitrile copolymers and acrylamide-acrylonitrile copolymers.

When preparing the 2-aminothiazoles and the dyes therefrom, as illustrated in Example 2, it is not necessary to isolate the free 2-aminothiazoles since the corresponding 2-acetaminothiazole can be hydrolyzed in situ and the dye prepared from the solution thus obtained.

What we claim is:

1. Monoazo dyestuffs having the general formula $$\begin{array}{c} R_2-C\!-\!-\!-\!N \\ \| \quad\quad \| \\ R_1-C \quad\ C\!-\!N\!=\!N\!-\!R \\ \diagdown\!\!_S\!\!\diagup \end{array}$$

wherein

R = the radical $$-\!\!\bigcirc\!\!\!\begin{array}{c}R_3 \\ -N \\ R_4\end{array}$$

with $R_5$ on the ring in which $R_3$ and $R_4$ represent a member of the class consisting of lower alkyl, lower hydroxyalkyl, lower cyanoalkyl, hydrogen and phenyl, and $R_5$ represents a member of the class consisting of methyl, chlorine and hydrogen, $R_1$ = a member of the class consisting of piperidinomethyl, lower dialkylaminomethyl, di($\beta$-cyanoethyl) aminomethyl and morpholinomethyl radicals, and $R_2$ = a member of the class consisting of hydrogen, phenyl, lower alkyl, piperidinomethyl and morpholinomethyl, $R_2$ being different from $R_1$.

2. Monoazo dyestuffs having the general formula $$\begin{array}{c} H-C\!-\!-\!-\!N \\ \| \quad\quad \| \\ R_1-C \quad\ C\!-\!N\!=\!N\!-\!R \\ \diagdown\!\!_S\!\!\diagup \end{array}$$

wherein

R = a residue of an N,N-lower dialkyl aniline coupling component and $R_1$ = a piperidinomethyl radical.

3. Monoazo dyestuffs having the general formula $$\begin{array}{c} H-C\!-\!-\!-\!N \\ \| \quad\quad \| \\ R_1-C \quad\ C\!-\!N\!=\!N\!-\!R \\ \diagdown\!\!_S\!\!\diagup \end{array}$$

wherein

R = a residue of an N,N-lower dialkyl aniline coupling component and $R_1$ = a morpholinomethyl radical.

4. The monoazo dye having the formula $$O\!\!\diagup\!\!\!\begin{array}{c}CH_2-CH_2 \\ \diagdown \\ CH_2-CH_2\end{array}\!\!\!\diagdown\!\!NCH_2C\!\!\diagup\!\!\!\begin{array}{c}HC\!-\!-\!-\!N \\ \| \quad\quad \| \\ \ \ \ \ C\!-\!N\!=\!N\!-\!\bigcirc\!-\!N(CH_3)_2 \\ \diagdown\!\!_S\!\!\diagup\end{array}$$

5. The monoazo dye having the formula $$O\!\!\diagup\!\!\!\begin{array}{c}CH_2-CH_2 \\ \diagdown \\ CH_2-CH_2\end{array}\!\!\!\diagdown\!\!NCH_2C\!\!\diagup\!\!\!\begin{array}{c}HC\!-\!-\!-\!N \\ \| \quad\quad \| \\ \ \ \ \ C\!-\!N\!=\!N\!-\!\bigcirc(CH_3)\!-\!N\!\!\diagup\!\!\!\begin{array}{c}C_2H_5 \\ CH_2CH_2CN\end{array} \\ \diagdown\!\!_S\!\!\diagup\end{array}$$

6. The monoazo dye having the formula $$O\!\!\diagup\!\!\!\begin{array}{c}CH_2-CH_2 \\ \diagdown \\ CH_2-CH_2\end{array}\!\!\!\diagdown\!\!NCH_2C\!\!\diagup\!\!\!\begin{array}{c}CH_3C\!-\!-\!-\!N \\ \| \quad\quad \| \\ \ \ \ \ C\!-\!N\!=\!N\!-\!\bigcirc\!-\!NH\!-\!\bigcirc \\ \diagdown\!\!_S\!\!\diagup\end{array}$$

7. The monoazo dye having the formula $$O\!\!\diagup\!\!\!\begin{array}{c}CH_2-CH_2 \\ \diagdown \\ CH_2-CH_2\end{array}\!\!\!\diagdown\!\!NCH_2C\!\!\diagup\!\!\!\begin{array}{c}HC\!-\!-\!-\!N \\ \| \quad\quad \| \\ \ \ \ \ C\!-\!N\!=\!N\!-\!\bigcirc(CH_3)\!-\!N\!\!\diagup\!\!\!\begin{array}{c}C_2H_5 \\ CH_2CH_2CN\end{array} \\ \diagdown\!\!_S\!\!\diagup\end{array}$$

8. The monoazo dye having the formula $$O\!\!\diagup\!\!\!\begin{array}{c}CH_2-CH_2 \\ \diagdown \\ CH_2-CH_2\end{array}\!\!\!\diagdown\!\!NCH_2C\!\!\diagup\!\!\!\begin{array}{c}HC\!-\!-\!-\!N \\ \| \quad\quad \| \\ \ \ \ \ C\!-\!N\!=\!N\!-\!\bigcirc\!-\!NH\!-\!\bigcirc \\ \diagdown\!\!_S\!\!\diagup\end{array}$$

References Cited in the file of this patent

UNITED STATES PATENTS

| | | |
|---|---|---|
| 2,726,237 | Towne et al. | Dec. 6, 1955 |
| 2,730,523 | Dickey et al. | Jan. 10, 1956 |
| 2,852,504 | Towne et al. | Sept. 16, 1958 |

OTHER REFERENCES

Sprague et al.: "J. A. C. S.," vol. 68, pp. 2155–2159 (1946).

Albertson: "J. A. C. S.," vol. 70, pp. 669–670 (1948).